April 24, 1962    P. H. STEPHENSON    3,031,090
MANIPULATING DEVICES

Filed March 2, 1959    2 Sheets-Sheet 1

Inventor
P. H. Stephenson
By
Holcomb, Wetherill & Brisbin
Attorneys

April 24, 1962 P. H. STEPHENSON 3,031,090
MANIPULATING DEVICES

Filed March 2, 1959 2 Sheets-Sheet 2

3,031,090
MANIPULATING DEVICES
Patrick H. Stephenson, Cambridge, England, assignor to Pye Limited, Cambridge, England, a British company
Filed Mar. 2, 1959, Ser. No. 796,408
Claims priority, application Great Britain Mar. 4, 1958
14 Claims. (Cl. 214—1)

The present invention relates to manipulating devices for the remote handling of objects, such as radioactive materials, and consisting of a master portion which can be controlled and moved by an operator and a slave portion which moves in dependence upon movements imparted to the master portion by the operator, or by the actuation of controls on the master portion. The master portion generally comprises a pivoted arm provided with finger and/or hand controls which, together with the arm, can be manipulated by the operator, and so move a slave arm and manipulating tongs or other tools carried thereby in a desired manner. Such manipulating devices are constructed with both the master and slave arms carried by a through-tube which, for the handling of radioactive materials extends through a radiation-proof shield separating the operator from the material to be handled, and are arranged adjacent to a transparent radiation-proof viewing window through which the operator can view the material and the manipulations performed by the slave arms and tongs. An operator can operate a separate manipulator with each hand. The arms are usually connected by a tie rod passing through the through-tube and mounted relative to the through-tube so that they can move in a plane normal to the plane of the shield toward and away from the shield and can also move through a plane parallel to the shield by a turning movement of the arms and tube together about the axis of the tube.

Whilst an operator is using such a manipulator difficulty may be encountered in viewing objects which are positioned at the side of the window and which require the operator also to stand in a position to one side of the window in order to manipulate the master arm to a position in which the slave arm can handle the object, whereby he cannot easily watch the operation of the slave arm and tongs.

It is an object of the present invention to overcome this disadvantage whereby the operator can more readily operate the manipulator to such side or lateral positions whilst still being able to watch the manipulations through the viewing window.

According to the present invention, means are provided for effecting relative lateral displacement between the master and slave portions of the manipulator.

According to a feature of the invention means are provided for effecting relative displacement between the master arm of a manipulator and the through-tube and slave arm of the manipulator in a lateral direction by rotation of at least one of said parts substantially about the axis of the tube.

In one construction according to the invention, instead of pivoting the master arm of the manipulator to a member which is rigidly attached to the through-tube as in prior constructions, the master arm is pivotally attached to a housing which can rotate relative to the through-tube. An electric actuator can provide the relative rotation between the master arm and the through-tube by means of a suitable linkage.

In operation, when the actuator is set in motion to effect relative movement between the master arm and the through-tube, the operator restrains the master end and provides a reaction whereby the through-tube and the slave arm are rotated relative to the master arm, and the slave arm is thereby laterally displaced with respect to the master arm. In order to reduce backlash between the master and slave arms means, such as a screw or a magnetic lock, are provided to clamp the rotatable housing to the through-tube after the desired lateral movement has been made. To this end a clamping control is provided within reach of the operator at the master end of the manipulator and the motion is transmitted to the rotatable housing through a flexible control, for example a cable. A limit switch may also be provided to protect the actuator from damage should the operator try to make a lateral displacement without first unclamping the rotatable housing.

With the construction according to the present invention a lateral displacement can be made in a few seconds and the slave arm can be displaced, for example up to 30°, in each direction relative to the master arm, that is to say on each side of the operator standing by the master arm in front of the viewing window.

The present invention also consists in a manipulating device having a mechanism for effecting relative lateral displacement between the master and slave ends of the manipulating device wherein means are provided for at least partially counterbalancing the slave portion during such lateral movements.

Such counter-balancing of the slave arm may be achieved by means of one or more weights carried from the through-tube. A weight may be mounted on a lever pivoted to the through-tube and connected to the slave arm through a linkage also pivoted to the through-tube and a tie rod extending through the through-tube. The pivot for the master arm and a pivoted linkage and tie rod connecting the master arm to the slave arm for effecting movement the slave arm in a direction towards and away from the shield and generally normal to the plane of the shield, are carried from the housing which is relatively rotatable with respect to the through-tube.

As the slave arm of the manipulator is laterally displaced the through-tube rotates with respect to the master arm, which is restrained by the operator in the manner previously described, and the counterbalance weight carried by the through-tube will also rotate with the through-tube to counterbalance the slave arm.

As it is not generally possible to mount the balance weight on a member pivoted at the centre line of the through-tube, a subsidiary weight may be mounted on the through-tube in a position to compensate for any out of balance caused by the pivoting of the member carrying the main balance weight at a point other than at the centre line of the through-tube.

The rotatable housing may comprise an annular casting mounted upon the through-tube by means of eccentric ball races which are adjustable to allow for centering and to reduce backlash.

Preferably the tie rod connecting the master arm and slave arm for movement of the latter in a direction towards and away from the master arm or the shield is formed with spherical or part-spherical bearing surfaces at its ends to allow the rod to cant or twist during lateral displacement of the slave arm with respect to the master arm.

The tie rods or linkages between the master arm or slave arm may be adjustable by means of left and right-hand threaded portions, which may be in the form of turn-buckles.

Advantageously at least the main counterbalance weight is made adjustable by forming this weight of a plurality of sections, each of which may be in the form of a cylinder or disc whereby the total weight can be altered by the addition or removal of the discs. Furthermore, each disc may be eccentrically mounted upon a spindle whereby the total moment exerted by the counterbalance weight can be altered by repositioning one or more discs which are then locked to the spindle thus the discs may be clamped upon a spindle at the end of the lever pivoted to the through-tube.

The invention will now be further described with reference to the accompanying drawings in which.

Figure 1:
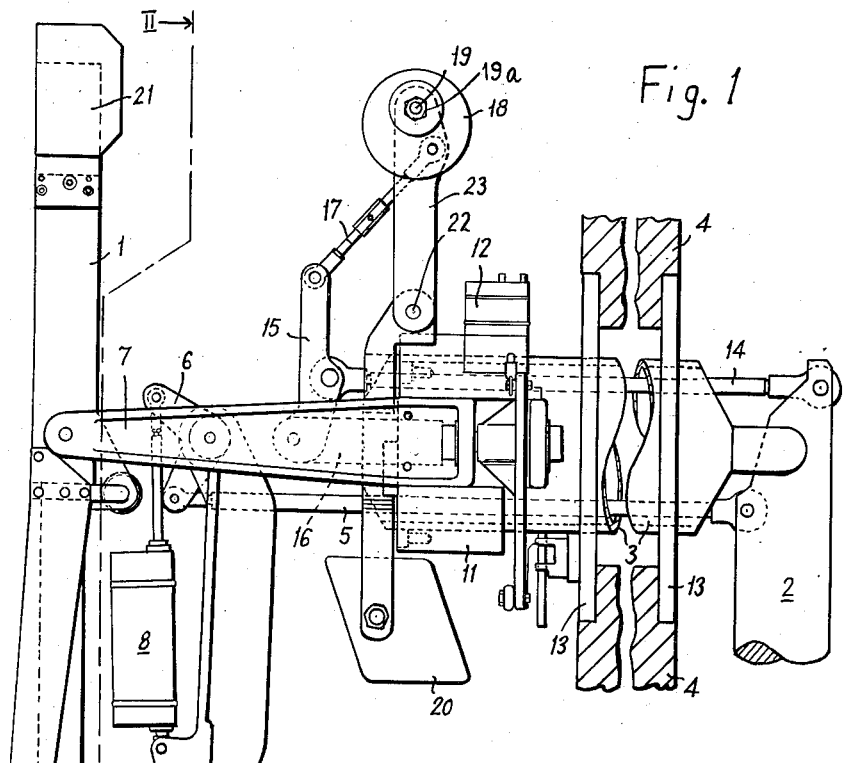
FIGURE 1 is a somewhat diagrammatic side elevation of part of one embodiment of manipulating device according to the invention.
Figure 2:
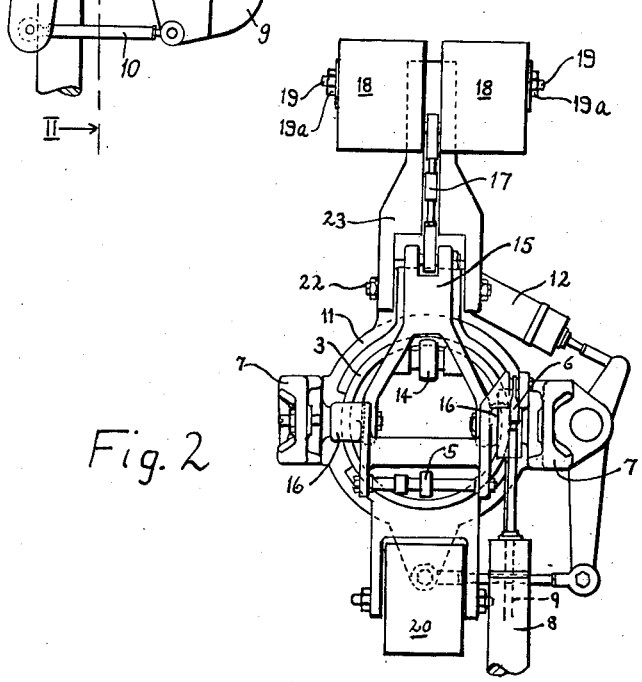
FIGURE 2 is an end view of part of the manipulating device taken from the master end along the line II—II, in FIGURE 1, and FIGURES 3a and 3b are explanatory diagrams.

Referring to FIGURES 1 and 2, the manipulating device comprises a master arm 1 and hand control portion and a slave arm 2 and tong portion which are carried at opposite ends of a through-tube 3 extending through a shield 4 intended to shield an operator at the master arm and hand control portion from a radio-active material to be handled by the slave arm and tongs of the manipulator. Only the upper portion of the master arm 1 and slave arm 2 have been shown, since the lower portions including the hand controls and tongs respectively are of known construction and form no part of this invention.

In order to achieve the desired movement of the slave arm in a plane normal to the plane of the shield towards and away from the latter, as is common in such manipulating devices the slave arm 2 is connected to one end of a tie rod 5, the opopsite end of which is connected to one end of a bell-crank lever 6 pivotally mounted between a pair of brackets 7. The tie rod 5 is formed with part-spherical ends forming bearing surfaces to allow it to cant or twist during lateral displacement of the slave arm of the manipulator as hereinafter described. The other end of the bell-crank lever 6 is connected to an actuator 8 in the form of an electric motor driving a worm gear. The actuator is also connected to a lever 9 which is coupled to the master arm 1 through a link 10. The master arm 1 is also pivoted to the brackets 7 which are themselves attached at diametrically opposite sides of an annular housing 11 which can rotate on the through-tube 3 and is mounted on eccentric ball races which are adjustable to allow for centering of the housing and to reduce backlash. The actuator 8 operates the linkage described to convey movement to the slave arm 2 in a direction towards and away from the screen 4, through the tie rod 5.

The mounting of the master arm 1 effectively on the housing 11 which can rotate relative to the through-tube 3 enables an operator to effect lateral displacement of the slave arm with respect to the master arm by operation of the actuator 12 connected between the through-tube 3 and housing 11. The actuator 12 also consists of an electric motor driving a worm gear. When this actuator is set in motion it applies an equal and opposite torque to the through-tube 3 and to the housing 11, but the operator restrains the master arm 1, and hence the housing 11 connected to it, and provides the necessary reaction sufficient to overcome any friction opposing rotation of the through-tube with respect to the housing 11 and so causes lateral displacement of the slave arm 2, carried by the through-tube, relative to the master arm.

In order to counterbalance the slave arm, a further tie rod 14 is provided which extends from the slave arm 2 through the through-tube to a lever 15 pivoted to ears 16 on the through-tube, the lever 15 being connected by a link 17 to a lever 23 mounted on a pivot 22 attached to the through-tube 3. This lever 23 carries a weight 18 in the form of two lead cylinders or thick discs mounted on a spindle 19 and which can be clamped thereto by means of nuts 19a. Each disc 18 is eccentrically mounted on the spindle 19 whereby the total moment exerted by the weights can be altered by repositioning one or both of the discs and locking them in position by tightening nuts 19a. A further lead weight 20 is mounted on the through-tube opposite to the first weight 18 to compensate the offsetting of the pivot 22 with respect to the centre line of the through-tube, which offsetting would otherwise produce an unbalance whenever the through-tube rotates. The master arm carries an independent counterbalance weight 21.

Sideways movement of the slave arm 2 parallel to the shield without lateral displacement relative to the master arm 1 can still be achieved, if desired, by corresponding sideways movement of the master arm, the actuator 12 being inoperative so that the housing 11 and through-tube 3 rotate together.

The present invention thus provides a mechanism allowing for lateral displacement of the slave arm of the manipulator relative to the master arm and also for counterbalancing of the slave arm during its movements. The pivoting linkage between the slave arm and the weight 18, including the tie rod 14 and lever 15 and link 17 allows the weight 19 to be effective during movement of the slave arm towards and away from the shield 2 as well as during lateral displacement of the slave arm.

Figure 3A:
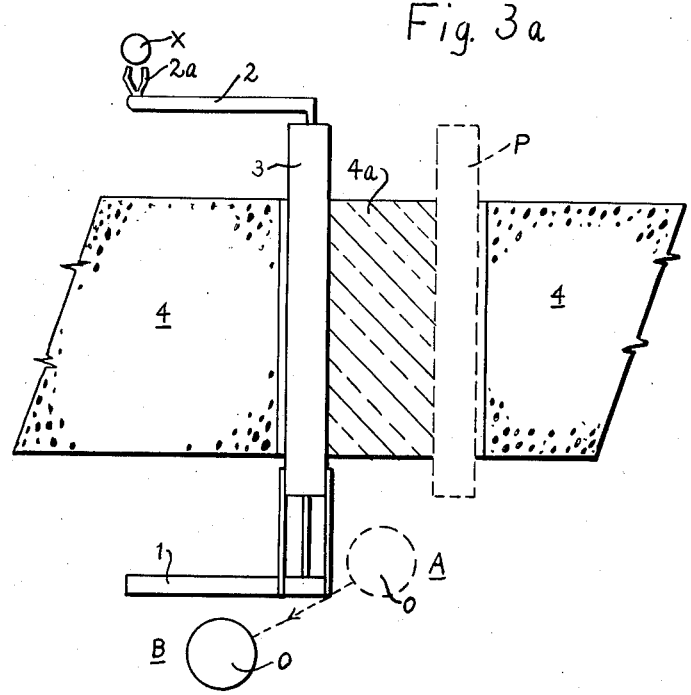
Figure 3B:
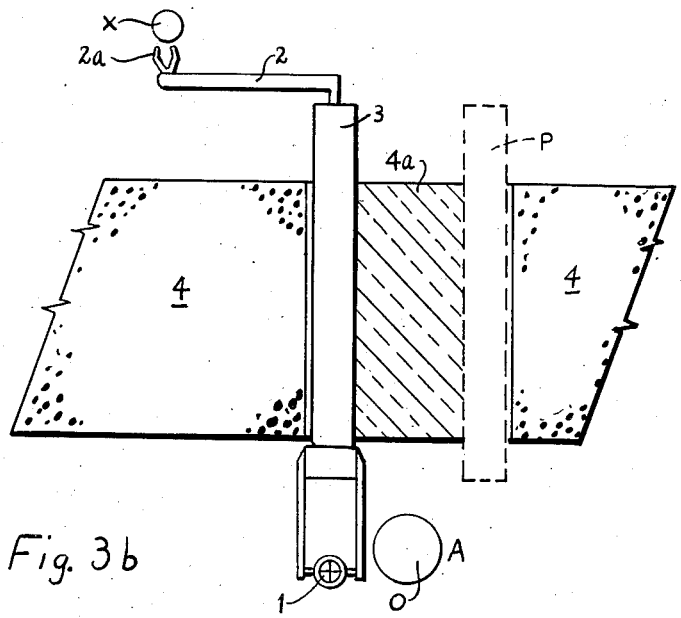

FIGURES 3a and 3b show diagrammatic plan views of manipulating devices comprising a master arm 1 with associated manual controls and a slave arm 2 with tongs 2a which are respectively carried at opposite ends of the through-tube 3 extending through the biological shield 4 intended to shield at operator O at the master arm 1 from the radio-active area containing the object X to be handled by the tongs 2a of the slave arm 2. The operator O views the manipulations of the slave arm 2 and tongs 2a through the radiation-proof window 4a.

FIGURE 3a shows the movement which has to be made by an operator O with prior constructions of manipulating device in order to handle an object X positioned laterally to one side of the viewing window 4a whilst FIGURE 3b shows diagrammatically the position of the operator for similar lateral movement of the slave arm 2 with a manipulating device according to the present invention.

It will be seen that with the manipulating device shown in FIGURE 3a, which does not incorporate the present invention, in order to displace the slave arm 2 laterally to handle the object X to the left of the viewing window 4a (as seen in the drawings), it is necessary for the operator O to move the master arm 1 to a corresponding position to the left of the viewing window, which means that the operator also has to move from the position A in front of the veiwing window to a position B at one side of the viewing window from where it is difficult to watch the operation of the slave arm 2 and the tongs 2a carried thereby manipulating the object X. As seen in FIGURE 3b however, with the arrangement according to the present invention, wherein it is possible to displace the slave arm 2 laterally with respect to the master arm 1 the tongs 2a on the slave arm can be moved to a position to handle the object X at the side of the viewing window 4a whilst the master arm 1 is still retained in a position in front of the viewing window, so that the operator O can also remain at position A in front of the viewing window and thereby still easily watch the manipulation of the tongs 2a through the viewing window. As shown in FIGURES 3a and 3b the manipulating device is intended to be operated by an operator's left-hand, but a similar manipulating device may be provided in position P for operation by the right-hand.

Whilst a particular embodiment has been described it will be understood that various modifications may be made without departing from the scope of this invention. Thus the counterbalance weights may take other forms besides those described. Moreover it is possible to omit the counterbalancing of the slave arm for certain applications, in which case the weights 18 and 20, levers 23 and 15, link 17, and tie rod 14 may be omitted. Furthermore the arrangement for connecting the master arm 1 to the tie rod 5 may be other than as described.

It will also be understood that the manipulator may be used for other purposes besides handling radio-active materials.

I claim:

1. A manipulating device for the remote handling of objects consisting of a master portion in the form of a pivoted master arm provided with manual controls which together with the arm can be manipulated by an operator and a slave portion which moves in dependence upon movements imparted to the master portion by the operator or by the actuation of controls on the master portion and consisting of a pivoted slave arm and a manipulating tool carried thereby, said master and slave arms being carried by a through-tube, in which the master arm is pivotally carried from a housing which is relatively rotatable with respect to the through-tube and is connected to the slave arm through a pivoted linkage also carried by the housing and a tie rod extending through the through-tube between said linkage and said slave arm, the relatively rotatable housing allowing relative lateral displacement to be effected between the master and slave arms of the manipulator and means for counterbalancing the slave arm so that the manipulator remains balanced for all positions of manipulation consisting of at least one weight mounted on a lever pivoted to the through-tube and connected to the slave arm through a further linkage also pivoted to the through-tube and a further tie rod extending through the through-tube between said further linkage and said slave arm.

2. A manipulating device as claimed in claim 1, in which at least a portion of the counterbalance weight is made adjustable.

3. A manipulating device as claimed in claim 2, in which the counterbalance weight is formed of a plurality of sections whereby the total weight can be altered by the addition or removal of sections.

4. A manipulating device as claimed in claim 3 in which at least a portion of the counterbalance weight is composed of a plurality of discs which are eccentrically mounted upon a spindle whereby the total moment exerted by the counterbalance weight can be altered by rotating one or more of the discs relative to the spindle, means being provided for locking the discs to the spindle.

5. A manipulating device as claimed in claim 1, in which an additional weight is mounted on the through-tube in a position to compensate for any out of balance effect caused by the pivoting of the member carrying the main balance weight at a point other than at the centre line of the through-tube.

6. A manipulating device for the remote handling of objects consisting of a master portion in the form of a pivoted master arm provided with manual controls which together with the arm can be manipulated by an operator and a slave portion which moves in dependence upon movements imparted to the master portion by the operator or by the actuation of controls on the master portion and consisting of a pivoted slave arm and a manipulating tool carried thereby, said master and slave arms being carried by a through-tube, in which the master arm is pivotally carried from a housing which is relatively rotatable with respect to the through-tube and is connected to the slave arm through a pivoted linkage also carried by the housing and a tie rod extending through the through-tube between said linkage and said slave arm, the relatively rotatable housing allowing relative lateral displacement to be effected between the master and slave arms of the manipulator and means for counterbalancing the slave arm so that the manipulator remains balanced for all positions of manipulation consisting of at least one adjustable weight mounted on a lever pivoted to the through-tube and connected to the slave arm through a member passing through the through-tube.

7. A manipulating device as claimed in claim 6 in which the rotatable housing comprises an annular casting mounted on the through-tube by means of eccentric ball races which are adjustable to allow for centering and to reduce back-lash.

8. A manipulating device as claimed in claim 6 in which the tie rod connecting the master arm and slave arm for movement of the latter in a direction towards and away from the master arm is formed with spherical bearing surfaces at its ends to allow the rod to cant or twist during lateral displacement of the slave arm with respect to the master arm.

9. A manipulating device as claimed in claim 6 in which means are provided for adjusting at least some of the linkages between the master portion and slave portion of the manipulating device.

10. In a manipulating device for the remote handling of objects and consisting of a master arm and a slave arm respectively pivotally connected at opposite ends of a through-tube and including means for effecting relative lateral displacement between the master arm and the slave arm, means for ensuring that the manipulator remains accurately balanced for all positions of manipulation of the master arm and the slave arm comprising a lever pivoted to the through-tube adjacent the master arm, at least one weight carried by the lever said weight comprising at least one member mounted eccentrically on a spindle carried by the lever, means for locking the weight in an adjusted position, a linkage mechanism pivoted to the through-tube adjacent the master arm and consisting of a link connected to the lever and a further lever connected to one end of a tie rod, said tie rod extending through said through-tube to said slave arm, a compensating weight mounted on the through-tube diametrically opposite to the first weight, a housing mounted on said through-tube and rotatable relative thereto, means pivotally supporting the master arm from the housing, a further tie rod extending between the slave arm and a linkage connected to said master arm and a counterbalance weight carried by said master arm.

11. A manipulating device as claimed in claim 10, in which the rotatable housing comprises an annular casting mounted on the through-tube by means of eccentric ball races which are adjustable to allow for centering and to reduce back-lash.

12. A manipulating device as claimed in claim 10 in which the tie rod connecting the master arm and slave arm for movement of the latter in a direction towards and away from the master arm is formed with spherical bearing surfaces at its ends to allow the rod to cant or twist during lateral displacement of the slave arm with respect to the master arm.

13. In a manipulating device for the remote handling of objects and consisting of a master arm and a slave arm respectively pivotally connected at opposite ends of a through-tube and including means for effecting relative lateral displacement between the master arm and the slave arm, means for ensuring that the manipulator remains accurately balanced for all positions of manipulation of the master arm and the slave arm comprising a lever pivoted to the through-tube adjacent the master arm about an axis transverse to the axis of the through-tube, a pair of weights carried by the lever, said weights being mounted eccentrically on a spindle carried by the lever one each side of said lever, means for locking the weights in an adjusted position, a linkage mechanism pivoted to the through tube and consisting of a link connected to the lever and a further lever connected between said link and one end of a tie rod, said tie rod extending through said through-tube to said slave arm, a compensating weight mounted on the through-tube diametrically opposite to the first weight, a housing mounted on said through-tube and rotatable relative thereto, an adjustable bearing for said housing for centering the housing relative to the through-tube, means pivotally supporting the master arm from the housing, a further tie rod extending between the slave arm and a bell crank lever connected to said master arm through a further linkage, and a counterbalance weight carried by said master arm.

14. In a maniplating device for the remote handling of objects and consisting of a master arm and a slave arm respectively pivotally connected at opposite ends of a through-tube and including means for effecting relative lateral displacement between the master arm and the slave arm, means for ensuring that the manipulator remains balanced for all positions of manipulation of the master arm and the slave arm comprising a lever pivoted to the through-tube adjacent the master arm, at least one weight carried by the lever means for adjusting the weight and locking the weight in an adjusted position, a linkage mechanism pivoted to the through-tube adjacent the master arm and consisting of a link connected to the lever and a further lever connected to one end of a tie rod, said tie rod extending through said through-tube to said slave arm, a housing mounted on said through-tube and rotatable relative thereto, means pivotally supporting the master arm from the housing, a further tie red extending between the slave arm and a linkage connected to said master arm and a counterbalance weight carried by said master arm.

References Cited in the file of this patent

UNITED STATES PATENTS 2,888,154     Jelatis _____ May 26, 1959